Sept. 19, 1961 H. MORRIS ET AL 3,000,803
THERMOCOUPLE CABLE ARRANGEMENTS
Filed June 24, 1957 2 Sheets-Sheet 1

Sept. 19, 1961 H. MORRIS ET AL 3,000,803
THERMOCOUPLE CABLE ARRANGEMENTS
Filed June 24, 1957 2 Sheets-Sheet 2
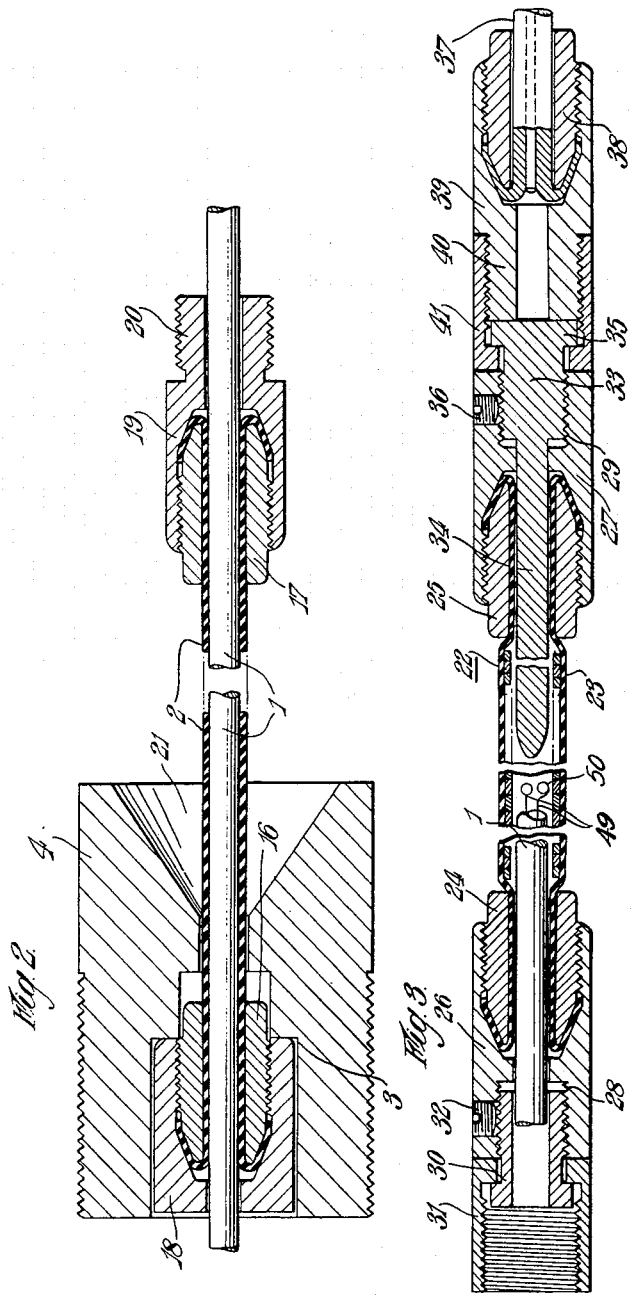

United States Patent Office 3,000,803
Patented Sept. 19, 1961

3,000,803
THERMOCOUPLE CABLE ARRANGEMENTS
Harry Morris, Sale, and Herbert Chilvers Knights, Meebrow, Risley, Warrington, England, assignors to United Kingdom Atomic Energy Authority, London, England
Filed June 24, 1957, Ser. No. 667,352
Claims priority, application Great Britain June 23, 1956
2 Claims. (Cl. 204—193.2)

This invention relates to nuclear reactors.

A limiting factor in present day nuclear reactor design is that of temperature of the sheath material of fuel elements in the reactor. In order that the reactor may be operated to keep the temperature of the sheath material as high as possible with safety it is desirable that the sheath temperatures should be presented to the control operator accurately and with minimum time lag. A small thermocouple is a satisfactory device for such temperature measurement, and the present invention provides a cable arrangement for use in association with a thermocouple on a fuel element.

It would be very desirable to have a large number of thermocouples on the sheaths of the fuel elements throughout the core of the reactor but this introduces many difficulties due to the cables which have to be connected with the thermocouples and run from the thermocouples through the vessel containing the core of the reactor. These cables would interfere with coolant gas flow and with the manipulation of other parts of the reactor, and would make charging and discharging of the fuel elements very difficult and cumbersome as the cables would prevent easy grappling. The present invention is concerned with means for handling a fuel element fitted with a thermocouple.

According to the present invention a thermocouple cable arrangement suitable for connecting with a fuel element fitted with a thermocouple and suitable for lifting and lowering of said element comprises a flexible thermocouple cable having an inner conductor and a sheath incapable of carrying a substantial load, a flexible load-bearing sheath surrounding the thermocouple cable of such length that said thermocouple cable extends through and beyond both ends of the flexible load-bearing sheath, an attachment member on one end of said load-bearing sheath for attaching said load-bearing sheath to a fuel element and a hollow flexible load-bearing tube demountably coupled to the other end of the load-bearing sheath to encompass the thermocouple cable where it extends beyond the load bearing sheath.

The load-bearing tube can have its free end connected with a lifting wire. For charging and discharging the whole assembly of wire, tube and load-bearing sheath is used, the lifting wire being coupled to a winding drum. For normal operation in a working reactor the hollow, flexible load-bearing tube and its lifting wire are removed and the thermocouple cable is electrically connected to a terminal block which has connections passing through the vessel containing the reactor core. In charging a column of fuel elements normal charging machinery is used for all fuel elements except the fuel element with the thermocouple attached, which is inserted last. In discharging, the fuel element fitted with the thermocouple is removed first and then normal discharging machinery is used for the other fuel elements in the same column. Thus all the normal charging and discharging can take place without hindrance from thermocouple cables.

An embodiment of the invention will now be described with reference to the acompanying drawings which shows the lifting arrangement for a fuel element having an associated thermocouple for measuring the temperature of the sheath of the element.

Of the figures in the drawings:

FIGURE 2 shows in section to a larger scale than FIGURE 1 the entire load transmitting means; and FIGURE 3 shows in section the entire means for inserting and removing the fuel element with associated thermocouple cable, this latter means being coupled with the load transmitting means of FIGURE 1 during the inserting and removing operation.

Figure 1:
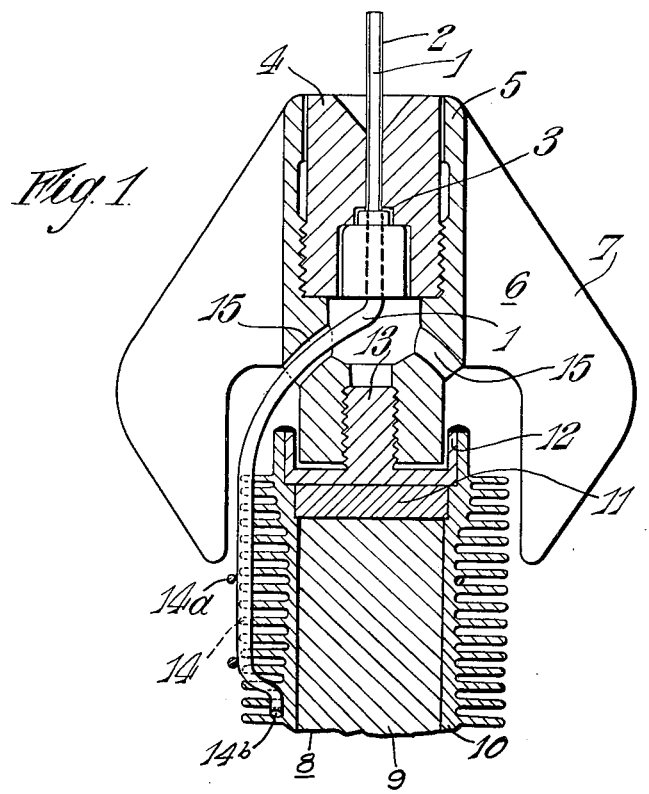
FIGURE 1 shows a fuel element head and one portion of the load transmitting means in sectional elevation.

In FIG. 1 a thermocouple cable 1 having a flexible load-bearing sheath 2 passes through a stepped hole 3 in a lifting block 4 which is screwed into a boss 5 of a finned fuel element locating member 6 having three fins 7. The member 6 carries a fuel element 8 comprising a fuel rod 9, helical finned can 10, magnesium oxide heat insulating disc 11 and end cap 12 with integral screwed plug 13. A longitudinal groove 14 is cut in the fins of the can 10 and six symmetrically spaced holes 15 are provided through the base of the locating member 6. The thermocouple cable 1 passes through the hole 15 nearest in line with the groove 14 and thence along the groove 14. The cable 1 is held in the groove 14 by stainless steel wire 14a passing round the can 10 at 3" intervals and finishes in a thermocouple hot junction 14b.

In FIG. 2 the thermocouple cable 1 extends through and beyond both ends of the load bearing sheath 2, from one end along the groove 14 and from the other end for a free length of about three feet. Its conductors 49 are provided with terminals 50 (FIG. 3) for connecting with a terminal block. The sheath 2 which is made of stainless steel wire in the form of a close wound helix is clamped between screwed tapered pins 16, 17 and clamping nuts 18, 19. The nut 18 is located in the stepped hole 3 and the nut 19 carries a coupling boss 20. A conical lead-in part 21 is provided in the lifting block 4. The arrangement shown by FIGURE 2 represents the means for transmitting the load during the inserting and removing operation as will become further apparent.

In FIG. 3 a length of hollow flexible load-bearing tube 22 is sheathed in stainless steel braiding 23 having the ends of the braiding clamped between screwed tapered pins 24, 25 and clamping nuts 26, 27. The nuts 26, 27 have screwed parts 28, 29, respectively. The part 28 carries a coupling member 30 which is clamped against the coupling boss 20 (FIG. 2) by a union nut 31. The member 30 is locked by a grub screw 32. The part 29 carries a plug 33 having a spigot 34 extending into the tube 22 and a coupling flange 35. The plug 33 is locked by a grub screw 36. A stainless steel lifting wire 37 has one end permanently attached to a winding drum and the other end splayed out and clamped between a screwed tapered pin 38 and clamping nut 39. The nut 39 has a screwed coupling boss 40 which is coupled with the plug 33 by a union nut 41. The arrangement shown by FIGURE 3 represents the means for inserting and removing the fuel element with the thermocouple cable associated therewith when elements 20 and 30 are coupled together, the thermocouple cable having been first inserted in tube 22.

In the operation of charging and discharging the fuel element 8 into and from a nuclear reactor the cable 1 is detached from its terminal block and the assembly of the lifting wire 37 to the flexible tube 22 is made. The free end of the cable 1 extending from the coupling boss 20 is then fed through the coupling member 30 and along the tube 22. The union nut 31 is then tightened so that the weight of the fuel element may be taken for charging and discharging via the lifting block 4, clamping nut 18, sheath 2, coupling boss 20, union nut 31, coupling member 30, screwed part 28, braiding 23, screwed part 29, plug 33, coupling flange 35, union nut 41 and lifting wire 37.

The spigot 34 of the plug 33 limits the bending of the flexible tube 22.

We claim:

1. In combination with a fuel element and a thermocouple cable associated with said fuel element, apparatus for remotely inserting into and removing from a charge tube said fuel element along with said thermocouple cable comprising means coupled to said fuel element for transmitting the load during the inserting and removing operation, said thermocouple cable extending from said fuel element in non-load bearing engagement within said load transmitting means and terminating with a portion thereof extending outside said load transmitting means, and means for inserting and removing said fuel element along with said thermocouple cable including a first coupling detachably coupled to said load transmitting means and a flexible load bearing tube connected to said first coupling and having said terminal portion of the thermocouple cable extending therewithin a second coupling to which the flexible load bearing tube is connected, said first and second couplings being connected at opposite ends of said flexible load bearing tube, and a third coupling having a lifting cable connected therewith, said second and third couplings being detachably coupled together.

2. Apparatus according to claim 1 wherein said load transmitting means comprises a pair of couplings one of which is coupled to said fuel element and the other of which is detachably coupled to said first coupling, and a load bearing sheath enclosing said thermocouple cable and having opposite ends connected to said pair of couplings.

References Cited in the file of this patent

UNITED STATES PATENTS

| | | |
|---|---|---|
| 1,720,092 | Powell | July 9, 1929 |
| 1,970,295 | Fitzpatrick | Aug. 14, 1934 |

OTHER REFERENCES

Nuclear Fuels, Gurinshy and Diens (editors), D. Van Nostrand Company Inc., New York, 1956, pp. 261–263. (Available Div. 46.)

The Engineer, February 8, 1957, pp. 216–218.

ORNL–1537, pp. 3–5, 54–61, date issued March 11, 1954. Copy in 204–193.2–.34.